(12) United States Patent
Nordbruch

(10) Patent No.: US 10,755,568 B2
(45) Date of Patent: Aug. 25, 2020

(54) METHOD AND SYSTEM FOR DRIVING A VEHICLE TO A FREE PARKING SPACE IN A PARKING FACILITY

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 629 days.

(21) Appl. No.: 15/521,461

(22) PCT Filed: Sep. 29, 2015

(86) PCT No.: PCT/EP2015/072323
§ 371 (c)(1),
(2) Date: Apr. 24, 2017

(87) PCT Pub. No.: WO2016/066350
PCT Pub. Date: May 6, 2016

(65) Prior Publication Data
US 2017/0323567 A1    Nov. 9, 2017

(30) Foreign Application Priority Data

Oct. 27, 2014    (DE) .................. 10 2014 221 746

(51) Int. Cl.
*G08G 1/14*        (2006.01)
*G05D 1/02*        (2020.01)
(Continued)

(52) U.S. Cl.
CPC ............. *G08G 1/14* (2013.01); *B60W 30/00* (2013.01); *B60W 30/06* (2013.01);
(Continued)

(58) Field of Classification Search
CPC .......... G08G 1/14; G08G 1/141; G08G 1/144; G08G 1/145; G08G 1/146; G08G 1/147; G08G 1/148; G08G 1/065; G08G 1/168
See application file for complete search history.

(56) References Cited

U.S. PATENT DOCUMENTS

2002/0143465 A1    10/2002   Uehara
2011/0182703 A1 *   7/2011   Alan ...................... E04H 6/183
                                                          414/231
(Continued)

FOREIGN PATENT DOCUMENTS

CN        1737875 A      2/2006
CN      101201395 A      6/2008
(Continued)

OTHER PUBLICATIONS

Cheng et al., Virtual Track: Applications and Challenges of the RFID System on Roads, pp. 42-47 (Year: 2014).*

(Continued)

*Primary Examiner* — Rupangini Singh
(74) *Attorney, Agent, or Firm* — Norton Rose Fulbright US LLP; Gerard Messina

(57) ABSTRACT

A method for driving a vehicle to a free parking space in a parking facility having a plurality of parking spaces, each parking space assigned a parking space marking that stores at least one piece of information about the occupancy of the parking space, includes the vehicle, when pulling into a parking space, marking the space as occupied via the parking space marking and, when pulling out of the parking space, marking the space as free again via the parking space marking. A corresponding parking facility, vehicle, and system by which to carry out such a method are also provided.

8 Claims, 1 Drawing Sheet

(51) Int. Cl.
  *B60W 30/00* (2006.01)
  *B60W 30/06* (2006.01)
  *B62D 15/02* (2006.01)
  *G05D 1/00* (2006.01)

(52) U.S. Cl.
  CPC ......... *B62D 15/027* (2013.01); *G05D 1/0261* (2013.01); *G08G 1/142* (2013.01); *G08G 1/146* (2013.01); *G05D 1/00* (2013.01); *G05D 2201/0213* (2013.01)

(56) References Cited

U.S. PATENT DOCUMENTS

| | | | |
|---|---|---|---|
| 2012/0086558 A1* | 4/2012 | Teske | G08G 1/017 340/10.4 |
| 2012/0092189 A1 | 4/2012 | Jordan | |
| 2014/0247162 A1* | 9/2014 | Jordan | G08G 1/14 340/932.2 |
| 2015/0139762 A1* | 5/2015 | Stephens | E04H 6/22 414/261 |
| 2016/0033963 A1* | 2/2016 | Noh | G05D 1/0282 701/2 |
| 2017/0212511 A1* | 7/2017 | Paiva Ferreira | G07C 5/008 |

FOREIGN PATENT DOCUMENTS

| | | |
|---|---|---|
| CN | 101964149 A | 2/2011 |
| CN | 102163375 A | 8/2011 |
| CN | 102800212 A | 11/2012 |
| CN | 103473951 A | 12/2013 |
| CN | 203455854 U | 2/2014 |
| CN | 103827936 A | 5/2014 |
| CN | 103942974 A | 7/2014 |
| CN | 104091372 A | 10/2014 |
| DE | 2105904 A1 | 9/1971 |
| DE | 102009006977 A1 | 8/2009 |
| DE | 102012015968 A1 | 3/2014 |
| EP | 2624236 A2 | 8/2013 |
| JP | 2003216450 A | 7/2003 |
| JP | 2003331382 A | 11/2003 |
| JP | 2004206199 A | 7/2004 |
| JP | 2006146805 A | 6/2006 |
| JP | 2011076215 A | 4/2011 |
| KR | 20090104166 A * | 10/2009 |

OTHER PUBLICATIONS

International Search Report dated Dec. 7, 2015 of the corresponding International Application PCT/EP2015/072323 filed Sep. 29, 2015.
Cheng Wei et al: "Virtual track: applications and challenges of the RFID system on roads," IEEE Network, New York, New York, Feb. 28, 2014, pp. 42-47.

* cited by examiner

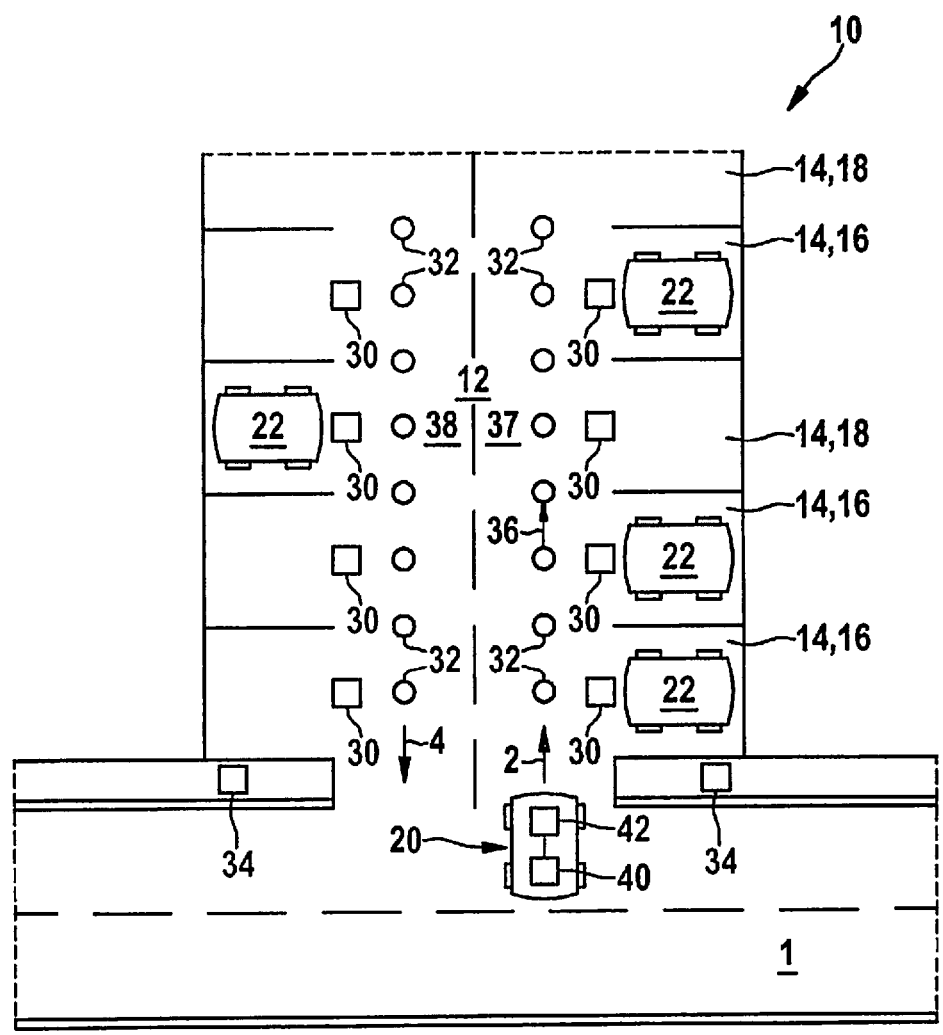

METHOD AND SYSTEM FOR DRIVING A VEHICLE TO A FREE PARKING SPACE IN A PARKING FACILITY

CROSS-REFERENCE TO RELATED APPLICATIONS

The present application is the national stage of International Pat. App. No. PCT/EP2015/072323 filed Sep. 29, 2015, and claims priority under 35 U.S.C. § 119 to DE 10 2014 221 746.6, filed in the Federal Republic of Germany on Oct. 27, 2014, the content of each of which is incorporated herein by reference in its entirety.

FIELD OF THE INVENTION

The present invention relates to a method for driving a vehicle to a free parking space in a parking facility having a plurality of parking spaces, each parking space being assigned a parking space marking. Further aspects of the present invention relate to a parking facility, to a vehicle, and to a system, which are each configured to carry out a method involving such parking space markings.

BACKGROUND

To facilitate the search for a parking space, services are known in which the driver transfers his/her vehicle to an operator of a parking facility, and this operator thereafter assumes the parking of the vehicle. When the vehicle is needed by its owner or by its driver again, the operator of the parking facility pulls the vehicle out of the parking space and makes it available for pick-up in a pick-up area. This service is also referred to as valet parking.

Previously, this service was usually implemented in that, upon arrival, the driver transfers his/her key to an employee of the parking facility operator. Pulling the vehicle into and out of the parking space is then carried out by the employee, who drives the vehicle from the transfer zone to the parking space and back to a pick-up area.

Furthermore, a method for the autonomous moving of a vehicle on a parking area is known from DE 10 2012 015 968 A1, for example. The vehicles are equipped with assistance systems, which allow autonomous driving. It is provided to enable an external control unit to access the vehicle in order to steer the vehicle to or from an assigned parking space of the parking area.

One challenge in connection with the fully automated parking is the navigation in the parking facility or in the parking garage. This is due to the fact, among other things, that generally there are no sufficient vehicle passageway markings or sufficient markings of the respective lanes in parking facilities, and, often in parking garages, particularly underground parking garages, no satellite navigation is available, and frequently no precise maps are available for navigation. Furthermore, it must be precisely detected which parking space in the parking facility is still free or already occupied, and in the parking garage, the height or the parking deck must be known or establishable by the vehicle, in addition to a position in the plane.

An RFID-based method, with the aid of which the occupancy of a parking space is detectable, is known from US 2012/0092189 A1. For this purpose, every parking space has an RFID tag. When a parking space is occupied by a vehicle, the signal of the RFID tag is blocked, so that a reading device, in response to an inquiry, is only able to receive responses from the RFID tags which are assigned to unoccupied parking spaces.

A method for determining a position of a vehicle on a vehicle passageway is known from US 2002/0143465 A1. For this purpose, magnets are embedded in the vehicle passageway, the lane being encodable via the polarity of the magnets or via a sequence of polarity changes.

SUMMARY

A need exists for a method with the aid of which an autonomously driving vehicle is able to precisely determine its position in a parking facility and able to find the way to a free parking space without help from a central control unit.

According to an example embodiment, a method is provided for driving a vehicle to a free parking space in a parking facility having a plurality of parking spaces, each parking space being assigned a parking space marking. It is furthermore provided that the parking space marking stores at least one piece of information about the occupancy of the parking space. The method includes the vehicle, when pulling into a parking space, marking the space as occupied via the parking space marking and, when pulling out of the parking space, marking the space as free again via the parking space marking.

The parking facility can be an open parking facility, a parking garage, or an underground parking garage, for example. Each parking space of the parking facility is assigned a parking space marking, which stores at least one piece of information as to whether the particular parking space is occupied or free. The vehicle is equipped with a parking assistance system, which allows autonomous driving. The assistance system thus assumes both the transverse guidance (steering) and the longitudinal guidance (acceleration and braking). The vehicle is initially driven by its driver to the vicinity of the parking facility or to a transfer zone in the parking facility. There, the driver exits and activates the parking assistance system to have his/her vehicle automatically driven to a free parking space.

The vehicle drives autonomously into the parking facility, the vehicle reading out the parking space markings assigned to the parking spaces using a suitable reading device. If a parking space is detected as occupied, the vehicle continues driving. If, in contrast, the vehicle detects a free parking space, the vehicle parks in this parking space and uses a writing device to re-write the parking space marking of the parking space, so that this now stores the state "parking space occupied." Depending on the embodiment variant of the method, the re-writing of the marking can take place prior to the start of the parking process, after the process of pulling in has ended, or during the parking maneuver.

If the driver or the owner needs his/her vehicle again, he/she activates the assistance system of his/her vehicle again via a suitable remote control unit, so that this vehicle pulls out of the parking space and navigates to a pick-up zone of the parking facility. While pulling out of the parking space, after pulling out of the parking space or immediately prior to pulling out of the parking space, depending on the embodiment variant of the method, the writing device of the vehicle again re-writes the parking space marking of the parking space, so that this now stores the state "parking space free."

The remote control unit can be integrated into the vehicle key, for example, or can be designed in the form of an application for a mobile telephone. In further specific embodiments of the method, the driver specifies a time at which he/she needs the vehicle again. The assistance system of the vehicle then activates itself automatically when the predefined time has been reached, so that the vehicle navigates to the pick-up zone in a timely manner and is available for pick-up by the driver.

In one specific embodiment of the method, a vehicle passageway of the parking facility leads past the parking spaces, and vehicle passageway markings via which the vehicle is able to detect a lane are assigned to the vehicle passageway. Furthermore, it is provided that, during the search for a free parking space, the vehicle follows a lane identified by the vehicle passageway markings and, while driving on the vehicle passageway, reads out the parking space markings of parking spaces abutting the vehicle passageway. When the vehicle detects a free parking space, it leaves the vehicle passageway and pulls into the free parking space.

If the vehicle passageway is identified by the vehicle passageway markings in such a way that the vehicle, when following the vehicle passageway markings, passes all parking spaces of the parking facility, it is ensured in any case that the vehicle finds a free parking space and is able to use this space, provided that at least one free parking space is still available in the parking facility. This, in turn, can be ensured, for example, by positioning a control device in front of the entrance to the parking facility, which clears the access passageway to the parking facility only if at least one free parking space is still present. The number of the free parking spaces can be easily ascertained by counting entering and exiting vehicles, and reducing the number of free parking spaces by one for each entering vehicle and increasing it by one for each exiting vehicle.

To steer the vehicle more quickly to a free parking space, it is provided in further specific embodiments that further pieces of driving information are transmitted to the vehicle by an infrastructure assigned to the parking facility and/or the vehicle passageway markings are influenced by a central system.

In one specific embodiment of the method, the parking space markings are designed as RFID tags, which are each assigned to a parking space. The RFID tags store at least the piece of information about the occupancy of the parking space. In further refinements of the method, the RFID tags can additionally store a parking space number, costs of the parking facility, information as to whether the parking facility is roofed, whether a charging station for electric vehicles is present, and/or whether additional security is being offered, for example.

The vehicle passageway markings are preferably designed in such a way that these include a piece of information about the direction of the lane. Such a piece of directional information can be, for example, an identification of a lane as a left lane or right lane, but can also be designed as an identification as to whether the lane leads into or out of the parking facility. In this way, it is ensured that the autonomously driving vehicles in the parking facility know at all times in which direction a lane leads, whereby possible collisions are prevented. Depending on the embodiment variant, the vehicle passageway markings can be designed as magnets embedded in the vehicle passageway and/or as RFID tags assigned to the vehicle passageway.

In the case of the design as RFID tags, the vehicle passageway markings can store a plurality of pieces of information, including also information about the permissible speed, curve radii, or information about the uphill grades of access and exit ramps, in addition to a piece of directional information. If the vehicle passageway markings are designed as magnets embedded in the vehicle passageway, pieces of information can be encoded, for example via the polarity of the magnet or via a sequence of multiple magnets, it being possible for each magnet to have a different polarity. For example, a right lane can be marked in that the magnetic north of the magnets points up, and a left lane can be marked in that its magnetic south points up.

Furthermore, it can be provided in the method that additional position markings are assigned to the parking facility, which provide pieces of information about a position and/or possible lanes. The piece of information can include a position inside a parking garage or an underground parking garage, in particular a piece of information about the level or the parking deck. A piece of information about possible lanes can notify the vehicle, for example, that only one lane is available at the particular location, for example, or can include a piece of navigation information which enables the vehicle to deliberately navigate to a certain lane. Moreover, the position marking enables the vehicle to precisely determine its position in the parking facility, even if no satellite navigation system is available at that time.

In one specific embodiment, the position markings are designed as RFID tags. Further conceivable options for the position markings, however, are also optical markings, for example in the form of QR codes. Moreover, QR codes can reference a website, in particular in the area of the entrance, on which all relevant data on the parking facility are stored.

A further aspect of the present invention relates to the provision of a parking facility including a plurality of parking spaces, each parking space being assigned a parking space marking, which is configured to store at least one piece of information about the occupancy of the particular parking space. Furthermore, the parking facility is preferably configured to carry out one of the described methods.

A further aspect of the present invention is the provision of a vehicle, including a control unit and a reading/writing device which is configured to read out and re-write parking space markings. The vehicle is furthermore configured to carry out one of the described methods.

It is also an object of the present invention to provide a system, including a parking facility and a vehicle, which are configured to jointly carry out a method described herein.

The parking facility, the vehicle, and the system are preferably configured to carry out one of the described methods for driving a vehicle. Accordingly, features described within the scope of the method apply accordingly to the parking facility, the vehicle, and the system, and vice versa, features described within the scope of the parking facility, the vehicle, or the system apply to the method.

As a result of the method(s) according to the present invention and the system(s) according to the present invention, including a parking facility and a vehicle, a vehicle is able to automatically establish its position in a parking facility and find a free parking space. Markings, with which the vehicle is able to interact, are used to ascertain a free parking space. Advantageously, it is provided that a vehicle pulling into a free parking space marks this space as occupied via a writing device. Following vehicles then detect this parking space as occupied, without requiring the intervention of a central control unit for this purpose.

If the vehicle passageways or the lanes of the parking facility are moreover identified with the aid of vehicle passageway markings, the vehicle is able to precisely follow the identified lane, without major deviations occurring. Even without using further sensors, with the aid of which the vehicle detects obstacles, for example, safe navigation in the parking facility is thus already possible. Furthermore, the vehicle passageways can be marked in such a way that the vehicle, when following the marked lane, is guided past the parking spaces of the parking facility. While passing by, the vehicle is able to automatically detect free parking spaces and pull into a free parking space. A central control unit is also not necessary for this.

Moreover, the vehicle is able to clearly and precisely detect its position in the parking facility due to the provision of position markings. This is in particular advantageous when no satellite navigation is available, for example in a parking garage or in an underground parking garage. Moreover, it would be difficult, or not possible at all, to determine the level or the parking deck even if a satellite signal were present.

Due to the cooperation between vehicle passageway markings and parking space markings, it is possible for an autonomously driving vehicle to navigate safely in the parking facility and attain a free parking space, without necessitating highly precise maps or a central control unit.

Exemplary embodiments of the present invention are shown in the drawing and are described in greater detail in the following description.

BRIEF DESCRIPTION OF THE DRAWINGS

FIG. 1 schematically shows a parking facility including a plurality of parking spaces, according to an example embodiment of the present invention.

DETAILED DESCRIPTION

FIG. 1 illustrates a parking facility 10, which includes a plurality of parking spaces 14, according to an example embodiment of the present invention. Parking facility 10 abuts a road 1 and includes an entrance 2, via which a vehicle 20 can reach parking facility 10, and an exit 4, via which a vehicle 20 can leave parking facility 10 again.

A driver of vehicle 20, after driving his/her vehicle 20 up to entrance 2, can leave vehicle 20 there, and activate the automatic parking process.

To assist the automatic parking process, vehicle 20 includes a control unit 40 and a reading/writing device 42. Reading/writing device 42 is configured to read out, and possibly re-write, parking space markings 30 assigned to parking spaces 14. Reading/writing device 42 is furthermore designed to read out vehicle passageway markings 32, which are integrated into a vehicle passageway 12 of parking facility 10.

In the specific embodiment illustrated in FIG. 1, vehicle passageway markings 32 are designed in the form of magnets embedded in vehicle passageway 12. Vehicle passageway markings 32, or the corresponding magnets, partially have differing polarities, which means that magnetic north points up in a portion of the magnets, and magnetic north points down in a portion of the magnets. Due to the polarity of the magnets and with the aid of vehicle passageway markings 32, vehicle passageway 12 is divided into two lanes, namely a right lane 37 and a left lane 38, right lane 37 leading into parking facility 10 and left lane 38 leading out of parking facility 10. In FIG. 1, the driving direction is indicated by an arrow denoted by reference numeral 36.

After vehicle 20 has entered entrance 2 and the driver has left vehicle 20, the automatic parking process is activated. Controlled by control unit 40, vehicle 20 now drives along right lane 37 identified by vehicle passageway markings 32. Vehicle 20 drives past parking space markings 30 of parking spaces 14 abutting right lane 37. In the situation illustrated in FIG. 1, vehicle 20 initially drives past two parking spaces 16 occupied by other vehicles 22, which it detects as occupied via reading/writing device 42 based on the pieces of information stored in parking space markings 30. Next, vehicle 20 drives past a free parking space 18, which vehicle 20 detects as free via reading/writing device 42 in that corresponding parking space marking 30 of parking space 14 is read out.

Since vehicle 20 has detected a free parking space 18, it now leaves right lane 37 and pulls into free parking space 18. Prior to the start of the parking maneuver, corresponding parking space marking 30 of parking space 14 is re-written via reading/writing device 42, so that parking space marking 30 now stores the piece of information "parking space occupied." After the process of pulling into the parking space has been completed, vehicle 20 waits until it is needed again by its driver or owner.

When vehicle 20 is needed again, it can be called by its driver or by its owner to a pick-up location. In the specific embodiment illustrated in FIG. 1, the pick-up location is identical to exit 4 of parking facility 10. To call vehicle 20, the driver can use an appropriate remote control unit, which, for example, is part of the vehicle key or is designed as an application on a mobile telephone. In another example embodiment, a pick-up time is programmed into control unit 40 before vehicle 20 is transferred to the operator of parking facility 10, so that vehicle 20 begins to automatically pull out of the parking space at the preprogrammed time.

When pulling out of a parking space 14, vehicle 20 exits the space and reaches vehicle passageway 12 of parking facility 10 again. There, vehicle 20 can identify lanes 37, 38 of vehicle passageway 12 again via reading/writing device 42, selecting left lane 38 leading out of parking facility 10 in the direction of exit 4. Vehicle 20 again detects left lane 38 via vehicle passageway markings 32 assigned to vehicle passageway 12. After reaching exit 4, vehicle 20 is available for pick-up by its driver.

Additional markings can be assigned to parking facility 10 for the identification of the positions of entrance 2 and exit 4. In the specific embodiment illustrated in FIG. 1, a respective position marking 34 is provided for this purpose in the area of entrance 2 and exit 4. Via position markings 34, vehicle 20 is able to receive pieces of information about the location of entrance 2 or exit 4, as well as further pieces of information, for example about lanes 37 and 38 available in parking facility 10. In an example embodiment, position markings 34 are used for notifying vehicle 20 or control unit 40 that markings 30, 32, for carrying out the method, are available in parking facility 10, and thus an automatic parking process can be offered.

The present invention is not limited to the exemplary embodiments and aspects described herein. Rather, a plurality of modifications are possible, based on the description and claims, which are within the capabilities of those skilled in the art.

What is claimed is:

1. A method for driving a vehicle to a free parking space in a parking facility, wherein the parking facility includes a plurality of parking spaces that are each assigned a respective parking space marking which is situated in the respective parking space, and wherein each of the parking space markings stores at least one piece of information about an occupancy state of the respective parking space to which the respective marking is assigned, the method comprising:

the vehicle, when pulling into one of the parking spaces, marking the respective parking space situated in the respective parking space as occupied using the parking space marking assigned to the respective parking space, the marking of the respective parking space as occupied including the vehicle directly re-writing the parking space marking assigned to the respective parking space using a read/write device situated in the vehicle so that the parking space marking assigned to the respective parking space stores an occupancy state that indicates that the respective parking space is occupied; and the vehicle, when pulling out of the respective parking space, marking the respective parking space as free using the parking space marking assigned to the respective parking space, the marking of the respective parking space as free including the vehicle directly re-writing the parking space marking assigned to the respective parking space so that the parking space marking assigned to the respective parking space stores an occupancy state that indicates that the respective parking space is free: wherein the parking space marking assigned to the respective parking space is an RFID tag;

wherein:
- a vehicle passageway of the parking facility extends beside, and spans, the parking spaces;
- the method further comprises:
  - the vehicle, while autonomously and driverlessly driving on the vehicle passageway, reading out, from the parking space markings of the parking spaces abutting portions of the vehicle passageway on which the vehicle drives, the occupancy states of the parking spaces abutting the portions of the vehicle passageway; and
  - in response to detection by the vehicle, based on the reading out, of a free parking space, the vehicle autonomously and driverlessly leaving the vehicle passageway and autonomously and driverlessly pulling into the free parking space;
  - wherein the parking space markings of the parking spaces abutting portions of the vehicle passageway which are read out by the vehicle are the RFID tags assigned to the parking spaces.

2. The method of claim 1, wherein:
vehicle passageway markings, via which the vehicle is able to detect a lane, are assigned to the vehicle passageway.

3. The method of claim 2, wherein the vehicle passageway markings include a piece of information about the direction of the lane.

4. The method of claim 2, wherein the vehicle passageway markings include at least one of magnets embedded in the vehicle passageway and as RFID tags assigned to the vehicle passageway.

5. The method of claim 1, wherein additional position markings, which provide pieces of information about at least one of a position and possible lanes, are assigned to the parking facility.

6. The method of claim 5, wherein the additional position markings are RFID tags.

7. A vehicle comprising:
a read/write device situated in the vehicle; and
processing circuitry situated in the vehicle, wherein the processing circuitry is configured to use the read/write device to:
when the vehicle pulls into one of a plurality of parking spaces of a parking facility that are each assigned a respective parking space marking storing information about an occupancy of the respective parking space to which the respective marking is assigned, the respective parking space marking being situated in the respective parking space, mark the parking space marking assigned to and situated in the respective parking space to indicate that the respective parking space is occupied, wherein the marking of the parking space marking assigned to the respective parking space to indicate that the respective parking space is occupied includes the vehicle directly re-writing, using the read/write device, the parking space marking assigned to the respective parking space so that the parking space marking assigned to the respective parking space stores an occupancy state that indicates that the respective parking space is occupied; and when the vehicle pulls out of the respective parking space, mark the respective parking space to indicate that the respective parking space is free, wherein the marking of the parking space marking assigned to the respective parking space to indicate that the respective parking space is free includes the vehicle directly re-writing, using the read/write device, the parking space marking assigned to the respective parking space so that the parking space marking assigned to the respective parking space stores an occupancy state that indicates that the respective parking space is free;

when the vehicle pulls out of the respective parking space, mark the respective parking space to indicate that the respective parking space is free, wherein the marking of the parking space marking assigned to the respective parking space to indicate that the respective parking space is free includes the vehicle directly re-writing, using the read/write device, the parking space marking assigned to the respective parking space so that the parking space marking assigned to the respective parking space stores an occupancy state that indicates that the respective parking space is free;

wherein the parking space marking assigned to the respective parking space is an RFID tag;

wherein:
a vehicle passageway of the parking facility extends beside, and spans, the parking spaces;
the processing circuitry further configured to:
  while the vehicles autonomously and driverlessly drives on the vehicle passageway, read out, using the read/write device, from the parking space markings of the parking spaces abutting portions of the vehicle passageway on which the vehicle drives, the occupancy states of the parking spaces abutting the portions of the vehicle passageway; and
  in response to detection, based on the reading out, of a free parking space, the processing circuitry controlling the vehicle to autonomously and driverlessly leave the vehicle passageway and autonomously and driverlessly pull into the free parking space;
  wherein the parking space markings of the parking spaces abutting portions of the vehicle passageway which are read out by the vehicle are the RFID tags assigned to the parking spaces.

8. A system comprising:
a parking facility that includes a plurality of parking spaces that are each assigned a respective parking space situated in the respective parking space marking that stores information about an occupancy of the respective parking space to which the respective marking is assigned; and a vehicle that includes a read/write device and processing circuitry, wherein the processing circuitry is configured to use the read/write device to:
when the vehicle pulls into one of the parking spaces, mark the parking space marking assigned to the respective parking space to indicate that the respective parking space is occupied, wherein the marking of the parking space marking assigned to the respective parking space to indicate that the respective parking space is occupied includes the vehicle directly re-writing, using the read/write device, the parking space marking assigned to the respective parking space so that the parking space marking assigned to the respective parking space stores an occupancy state that indicates that the respective parking space is occupied; and
when the vehicle pulls out of the respective parking space, mark the respective parking space to indicate that the respective parking space is free, wherein the marking of the parking space marking assigned to the respective parking space to indicate that the respective parking space is free includes the vehicle directly re-writing, using the read/write device, the parking space marking assigned to the respective parking space so that the parking space marking assigned to the respective parking space stores an occupancy state that indicates that the respective parking space is free;
wherein the parking space marking assigned to the respective parking space is an RFID tag;
wherein:
a vehicle passageway of the parking facility extends beside, and spans, the parking spaces:
the processing circuitry further configured to:
while the vehicle autonomously and driverlessly drives on the vehicle passageway, read out, using the read/write device, from the parking space markings of the parking spaces abutting portions of the vehicle passageway on which the vehicle drives, the occupancy states of the parking spaces abutting the portions of the vehicle passageway; and
in response to detection, based on the reading out, of a free parking space, the processing circuitry controlling the vehicle to autonomously and driverlessly leave the vehicle passageway and autonomously and driverlessly pull into the free parking space;
wherein the parking space markings of the parking spaces abutting portions of the vehicle passageway which are read out by the vehicle are the RFID tags assigned to the parking spaces.

* * * * *